United States Patent [19]

Yarkoni et al.

[11] Patent Number: 5,418,928
[45] Date of Patent: *May 23, 1995

[54] APPARATUS FOR CONFIGURING RELATIVE OF A CACHE MEMORY IN A CACHE MEMORY ARRAY

[75] Inventors: Eran Yarkoni, Haifa; Nabeel Sakran, Nazareth, both of Israel

[73] Assignee: Intel Corporation, Santa Clara, Calif.

[*] Notice: The portion of the term of this patent subsequent to May 9, 2012 has been disclaimed.

[21] Appl. No.: 93,984

[22] Filed: Jul. 19, 1993

Related U.S. Application Data

[60] Continuation of Ser. No. 865,082, Apr. 8, 1992, abandoned, which is a division of Ser. No. 534,750, Jun. 7, 1990, abandoned.

[51] Int. Cl.⁶ .................................. G06F 13/00
[52] U.S. Cl. .................. 395/425; 364/DIG. 1; 364/243; 340/825.5; 340/825.82
[58] Field of Search ................ 395/425; 340/825.5, 340/825.82

[56] References Cited

U.S. PATENT DOCUMENTS

| | | | |
|---|---|---|---|
| 3,866,183 | 2/1975 | Lange | 364/200 |
| 4,360,870 | 11/1982 | McVey | 364/200 |
| 4,463,420 | 7/1984 | Fletcher | 364/200 |
| 4,468,729 | 8/1984 | Schwartz | 364/200 |
| 4,481,579 | 11/1984 | Kinghorn | 364/200 |
| 4,682,283 | 7/1987 | Robb | 364/200 |
| 4,811,209 | 3/1989 | Rubinstein | 364/200 |
| 4,951,248 | 8/1990 | Lynch | 364/900 |
| 4,964,038 | 10/1990 | Louis et al. | 364/200 |
| 4,980,823 | 12/1990 | Liu | 364/200 |
| 5,014,195 | 3/1991 | Farrell et al. | 364/200 |
| 5,029,070 | 7/1991 | McCarthy et al. | 364/200 |
| 5,175,833 | 12/1992 | Yarkoni et al. | 395/425 |
| 5,175,859 | 12/1992 | Miller et al. | 395/800 |
| 5,202,968 | 4/1993 | Sato | 395/400 |

*Primary Examiner*—Christopher B. Shin
*Attorney, Agent, or Firm*—Blakely, Sokoloff, Taylor & Zafman

[57] ABSTRACT

A cache memory which includes a cache controller formed on a single substrate. A plurality of the memories may be used in an array. The memories themselves determine how many other memories are in an array and each of their relative positions in the array. From this information, each memory sets the range of its set fields and the size of its tag fields. This is done on reset with the configuration information being distributed among the memories themselves, without being centrally stored, and in a manner transparent to the software.

6 Claims, 5 Drawing Sheets

FIG_1A

FIG_1B

FIG_1C

FIG_1D

FIG_1E

FIG_3

FIG_4

FIG_5A

FIG_5B

FIG_6A

FIG_6B

APPARATUS FOR CONFIGURING RELATIVE OF A CACHE MEMORY IN A CACHE MEMORY ARRAY

This is a continuation of application Ser. No. 07/865,082, filed Apr. 8, 1992, now abandoned, which is a divisional of application Ser. No. 07/534,750, filed Jun. 7,1990, now abandoned.

BACKGROUND OF THE INVENTION

1. Field Of The Invention

The invention relates to the field of cache controllers and cache memories, particularly for microprocessors.

2. Prior Art

The cache controller and cache memo of the present invention is intended for use with the Intel 386 TM microprocessor, although the invention described may be used with other processing units. Intel Corporation manufactures the Part No. 82385, a high performance 32-bit cache controller for use with the Intel 386 TM. This part is used in conjunction with a 32Kbyte cache memory. Many of the signals used in the Intel 82385 and some of the circuit of this prior ad controller are incorporated in the controller of the present invention. A description of the Intel 82385 can be found in "*Microprocessor and Peripheral Handbook, Vol. 1 Microprocessor*", published by Intel Corporation beginning at page 4-287.

With the Intel 82385 as well as other prior a cache controllers, the controller provides an interlace between a microprocessor's local bus and a system bus. The controller also communicates with the cache memory. The controller typically includes the local bus interface, system bus interface, cache directory and cache control circuits. An ordinary static memo is often used for the cache memory.

The present invention is a departure from the Intel 82385 in that the cache controller and cache memo are fabricated on a single chip. Moreover, one, two or four of these chips may be used as pa of a cache array. The chips themselves are able to determine how many other members are in this array and each chip determines its relative position in the array.

The prior a discloses numerous computer systems where circuits may be added into the system with the system recognizing the additional circuits and adjusting for them. For example, microprocessor systems are made with "bit-slice" circuits allowing several of the circuits to be coupled together to provide a microprocessor of a desired width (e.g., 4-bit, 8-bit microprocessor, etc.). Memory is frequently added to a computer system with the system adapting to the additional memory. In some cases, a microprocessor writes and reads into different address locations in order to determine how much memory is present on a bus. In other cases, the memory modules contain information concerning its resources.

As will be seen, the present invention provides a unique method and apparatus for configuring a cache array. The information concerning how many cache memories there are in the array and the relative position of each is distributed among the cache memories and, in effect, is transparent to the overall system. Each of the cache memories is identical, thus there is no need to preprogram or otherwise identify a memory before it is placed in the array.

SUMMARY OF THE INVENTION

A cache controller/cache memory is described which is formed on a single substrate. A plurality of these memories may be employed in an array. Each of the memories includes a cache directory for providing storage for a plurality of tag fields and a plurality of set fields. And, as is typically the case, the set fields based on incoming addresses select predetermined ones of the stored tag fields for comparison with an incoming address. A control means for the cache memory generates signals representing the relative position of the cache memory in an array with other of such cache memories and controls the range of the set fields and the size of the tag fields based on these signals. In the currently preferred embodiment, the signals representing the relative position of the cache memory in the array is generated within the memory itself, is not centrally stored and the range of the set fields and the size of the tag fields are adjusted in a manner transparent to the software.

DETAILED DESCRIPTION OF THE PRESENT INVENTION

A cache controller/cache memory, fabricated on a single die or chip is described. In the following description, numerous specific details are set forth such as specific binary states, number of bits, etc. in order to provide a thorough understanding of the present invention. It will be obvious to one skilled in the art that the present invention may be practiced without these specific details. In other instances, well known circuits are not described in detail in order not to unnecessarily obscure the present invention.

Overview Of The Present Invention

A cache controller and cache memory fabricated on a single substrate is described. (In the following description, the combination of the controller and cache or cache memory is sometimes referred to simply as the controller/cache memory or the cache memory). In the currently preferred embodiment the controller/cache memory is fabricated employing metal-oxide-semiconductor (MOS) technology, more specifically complementary MOS technology. Any one of a plurality of well-known processes may be used to fabricate the cache memory. In the currently preferred embodiment, each of the controller/cache memories includes a controller and 16Kbytes of cache memory. Many aspects of the currently preferred embodiment are not described since they are well-known in the prior art and are used in the prior art cache controllers, particularly the Intel 82385 and the cache memory of the Intel 486 ™.

general, the controller/cache memory of the present invention is coupled between the local bus of a microprocessor and a system bus. One, two or four controller/cache identical memories may be used. In the currently preferred embodiment, the number of cache memories in the cache memory array is essentially transparent in the system.

The information concerning how many cache memories there are and the address range associated with each is distributed among the cache memories themselves. Self-configuration automatically occurs upon activation of the system and, more particularly, at the time the reset signal appears.

The information concerning the number of cache memories in the system and the relative position of each of them (e.g., whether a particular cache memory is 1 of 1, 1 of 4, 2 of 4, etc.) is determined by each of the cache memories in an array. Each cache memory includes a configuration terminal which is wired differently (external to the cache memory) depending upon the cache memory's position in the army, as will be seen.

For instance, when the computer system is fabricated, four sockets can be included within the system for a cache array, each for receiving one of the invented cache memories. A user may then place one, two or four cache memories in the system as desired. Each socket is identically wired except for one lead or pin, the "configuration terminal". The first cache memory in the army has its configuration terminal coupled to ground, the second to the reset line, the third to the Ready0# line and the fourth to the $V_{cc}$ potential. As will be seen, when the system is reset, each of the memories is able to determine its position in the array and the total number of cache memories in the array.

The size of the tag fields and the range of the set fields of the cache directory change depending on the number of cache memories in the array. In the currently preferred embodiment, two bits ($A_{12}$ and $A_{13}$), in effect, shift from being part of the tag field to being part of the set field. These bits are used to enable different ones of the cache memory in the array.

Currently Preferred Embodiment Of The Cache Controller/Cache Memory

As mentioned, each chip or substrate includes both the cache controller and a 16Kbyte cache memory. The features of the Intel 82385 for the most part are incorporated in the present invention: Additionally, each controller/cache memory can map four gigabytes of main memory into its 16K cache memory such that in a maximum configuration (four controller/cache memories in an array) four gigabytes of main memory are mapped into a 64K cache. The cache memory is unified for code and data. The controller provides a cache consistency mechanism which guarantees that the cache memory has the most recently updated version of the main memory. Consistency support does not impact the performance of the microprocessor coupled to the controller/cache memory. The internal structure of the controller/cache memory in many ways is similar to the controller/cache memory commercially available as part of the Intel 486 ™ except that the controller/cache memory size is double that of the Intel 486 ™. For example, the controller/cache memory of the present invention is four-way set associative and employs a pseudo LRU replacement algorithm. The line size is 16 bytes and a full line is fetched from memory for every miss condition. The controller/cache memory's write mechanism employs a with through algorithm enhanced by a four deep write buffer. Cache consistency is provided by the SAHOLD/SEADS# snooping mechanism, similar to that employed in the Intel 486 ™. in actual performance, the controller/cache memory of the present invention is able to run a zero wait state, 33 mHz, non-pipelined read cycle with the Intel 386 ™ microprocessor if the data exists in the cache memory. Obviously, if the data does not exist in the cache memory, the performance will depend on the system bus latency. Memory write cycles can run with zero wait states if the write buffer is not filled.

Figure 3:
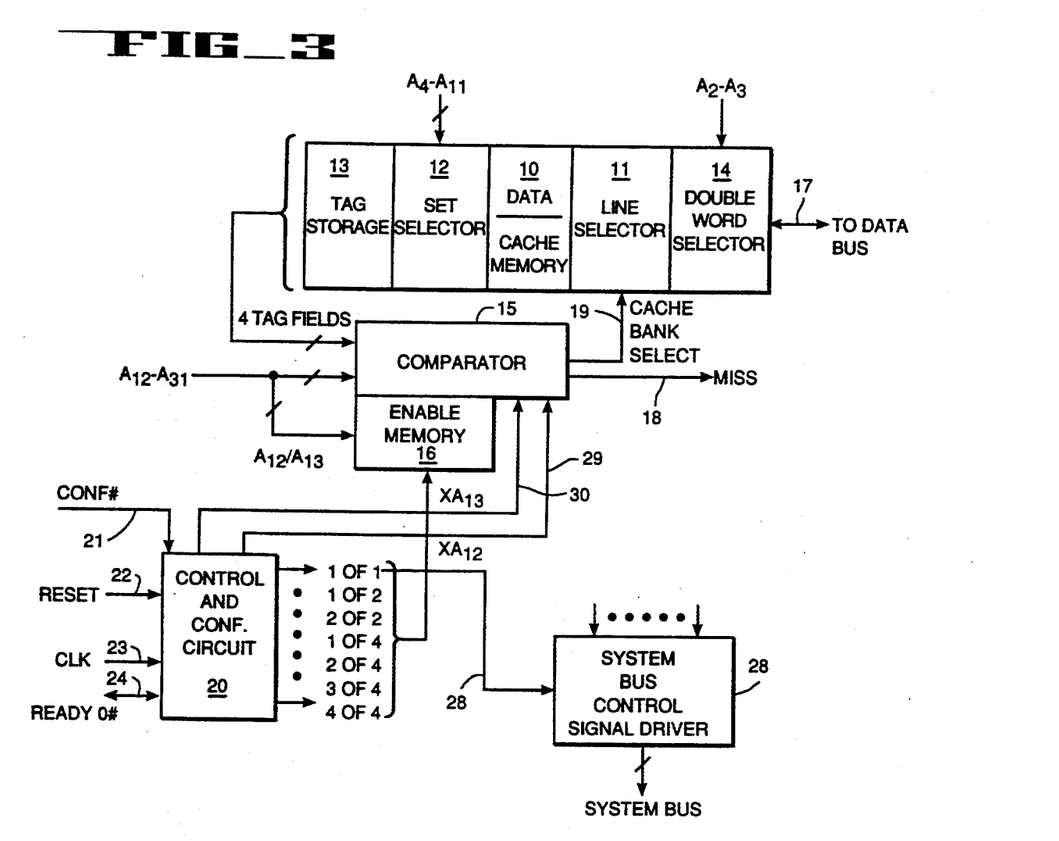
FIG. 3 is a block diagram illustrating the controller/cache memory of the present invention.

Referring now to FIG. 3, the portions of the controller/cache memory needed to understand the present invention are illustrated. The cache or cache memory 10—that is, where the data is stored, is shown as memory 10. Four banks of memory are used for the 4 way associative cache. As is typically the case, the data storage comprises a Static random access memory, more specifically, where each bit of data is stored in a six transistor bistable cell.

Data is addressed in the cache memory 10 by the set selector 12. The set selector 12, includes a plurality of set fields (8 bits wide). For each combination of the address bits $A_4$ through $A_{11}$, the set selector selects data in the four banks of the cache memory 10 and four tag fields in the tag storage 13.

As is commonly done in cache controllers, the tag field or fields is compared with the incoming address to determine if the data is present in the cache memory 10. Comparator 15 compares the incoming address bits $A_{12}$ through $A_{31}$ with the four tag fields. The result of this comparison either selects one of the four banks of cache memory as indicated by line 19 coupled to the line selector 11, or a miss is issued as indicated by line 18. The address bits A2 and A3 are for double-word selection through selector 14. Data is coupled to (and from) the cache memory on the bus 17.

As will be described in greater detail, the address bits $A_{12}$ and $A_{13}$ in effect shift from tag bits to set bits as cache memories are added to the array. More specifically, the bits $A_{12}$ and $A_{13}$ are used to enable specific ones of the controller/cache memories as indicated by the enable memory circuit 16.

The control and configuration circuit 20 determines how many controller/cache memories are in the array and the particular memories relative position in the array (e.g., 1 of 1,2 of 4, etc.). The control and configuration circuit 20 receives: a CONF# signal on line/terminal 21, a reset signal on line/terminal 22, a clocking or timing signal on line/terminal 23, and receives and provides a Ready0# signal on line/terminal 24. From these signals, the control and configuration circuit 20 determines whether the particular memory is 1 of 1, 1 of 2, 2 of 2, 1 of 4, 2 of 4, 3 of 4, or 4 of 4 in an array. This information is coupled to the enable memory circuit 16 and as will be discussed, determines how the bits $A_{12}$ and $A_{13}$ are used. If, by way of example, there are two controller/cache memories in an array, bit $A_{12}$ is used to determine which of the two memories is selected while bit $A_{13}$ remains part of the tag field and participates in the comparison process. The signals $XA_{12}$ and $XA_{13}$ on lines 29 and 30 respectively, issue from the circuit 20 and determine whether the comparator considers bits $A_{12}$ and/or $A_{13}$ in the comparison process. Again, by way of example, if there are four controller/cache memories in an array both bits $A_{12}$ and $A_{13}$ are ignored as part of the comparison process.

Also as will be discussed later, when there are more than one controller/cache memory in an array, the first of the memories provides the control signals for the system bus. Thus, if a signal is provided on line 28 indicating that a particular controller/cache memory is "1 of 1", the system bus control signal driver 28 is activated, allowing signals to be driven on to the system bus from the "1 of 1" controller/cache memory for all the memories in the array.

Figure 2:
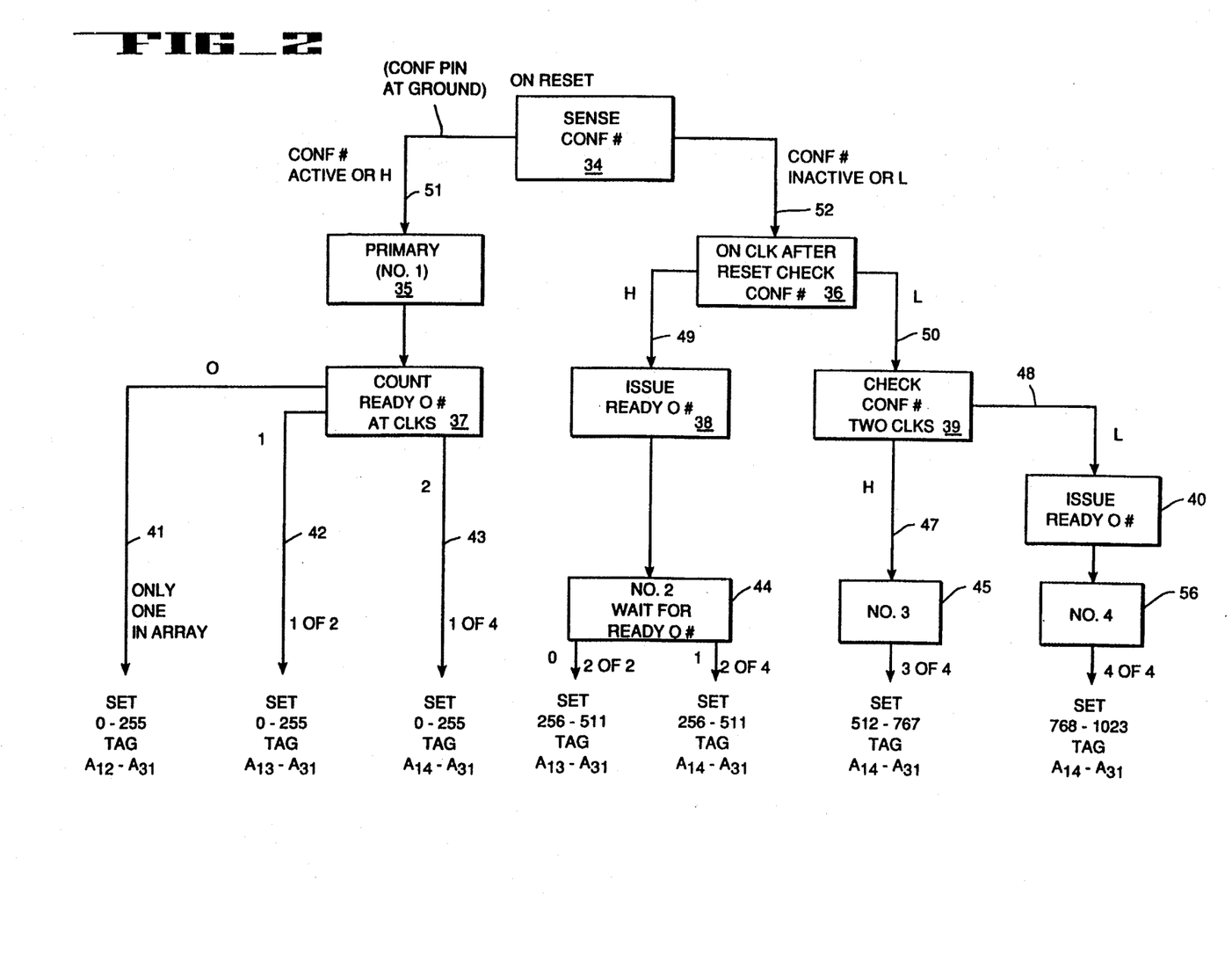
FIG. 2 illustrates the logic implemented by the cache controller of the present invention.

The logic implemented by the control and configuration circuit 20 insofar as it involves the present invention is shown in FIG. 2.

On reset, as will now be described, each of the controller/cache memories determine its relative position in an array and how many memories are in the array (1 of 4, 2 of 4, etc.). As indicated by block 34, when the reset signal is high, circuit 20 senses the potential on terminal 21. If this potential is a first predetermined signal, (in the preferred embodiment, ground potential, that is, CONF# is active) the memory is the primary or first (NO. 1.) memory in an array. (The number of other memories in the array is not known at this time by memory NO. 1.) The sensing of the first predetermined signal is indicated by line 51 in FIG. 2 and the recognition by the memory of its status as NO. 1 in the array by block 35. As indicated by block 37, this first controller/cache memory counts the number of Ready0# signals that occur during the next four clocking signals to determine how many other controller/cache memories are in the array. Specifically, if no Ready0# signals are counted as indicated by line 41, it is the only memory in the array, if one Ready0# signal is sensed there are two memories in the array, and, if two signals are counted there are four memories in the array as indicated by line 43.

If, on the other hand, on reset when terminal 21 is sensed, a second predetermined signal is found (specifically, 5 volts) the controller/cache memory knows that it is not NO. 1 and proceeds as indicated by line 52 to step 36.

On the next clock signal after reset, the potential on the configuration terminal is again sensed by the memories except by the NO. 1 memory. As indicated by the block 36, if the CONF# terminal is high (line 49) the circuit provides a Ready0# signal on terminal 24 (block 38) and as indicated by block 44 this memory now counts Ready0# signals (if no longer reacts to the potential on the configuration terminal). The memory knows it is NO.2 in the array. If no Ready0# signals are received the memory is "2 of 2", and if one Ready0# signal is counted, the memory is "2 of 4".

In contrast, at step 36, if the CONF# signal is low (indicated by line 50) the configuration terminal is again sampled after two clock cycles as indicated by block 39. If at this sampling, CONF# is high (line 47) the memory is "3 of 4 " (block 45). ! f at step 39 the CONF# signal is low (line 48), the memory provides a signal on a Ready0# signal (block 40) and then knows that it is "4 of 4 " (block 46).

The logic illustrated by FIG. 2 is readily implemented using well known circuits and, as mentioned, is part of the control and configuration circuit 20 of FIG. 3.

Figure 1A:
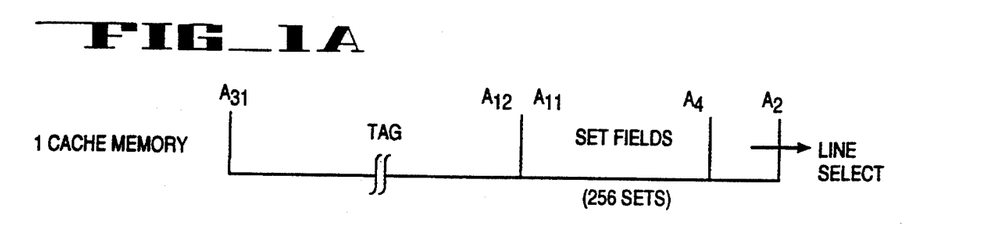
FIG. 1A illustrates the address bits allocation for the tag field, set field and line select bits when one cache memory is used in the present invention.
Figure 1B:
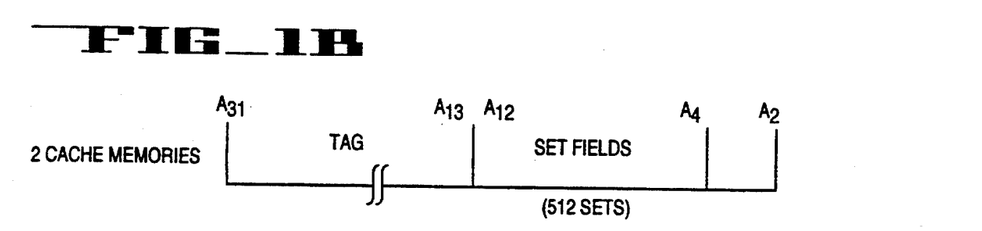
FIG. 1B illustrates the address bit allocation for the tag field, set field and line select bits when two cache memories are used in the present invention.
Figure 1C:
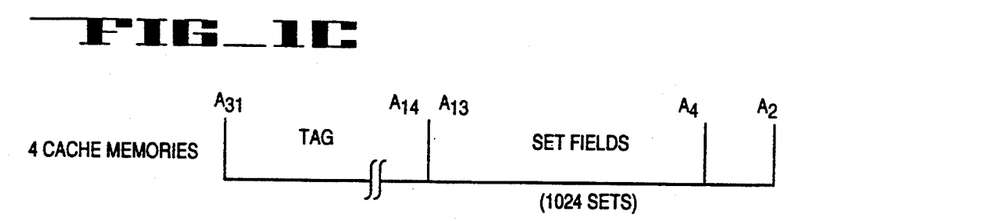
FIG 1C illustrates the address bit allocation for the tag field, set field and line select bits when four cache memories are used in the present invention.
Figure 1D:
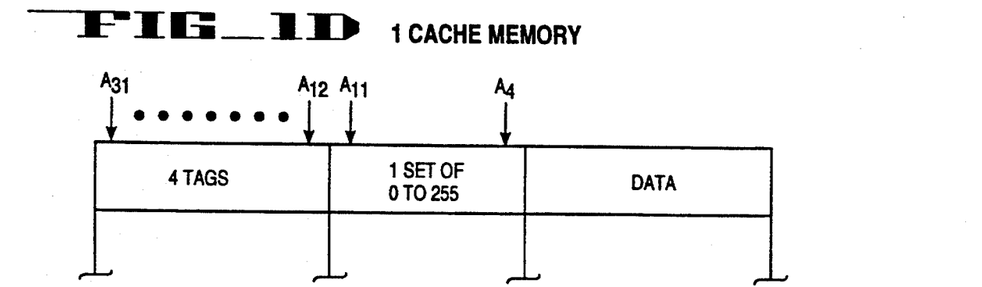
FIG. 1D illustrates the tag field range and set field size with one cache memory in an array.
Figure 1E:
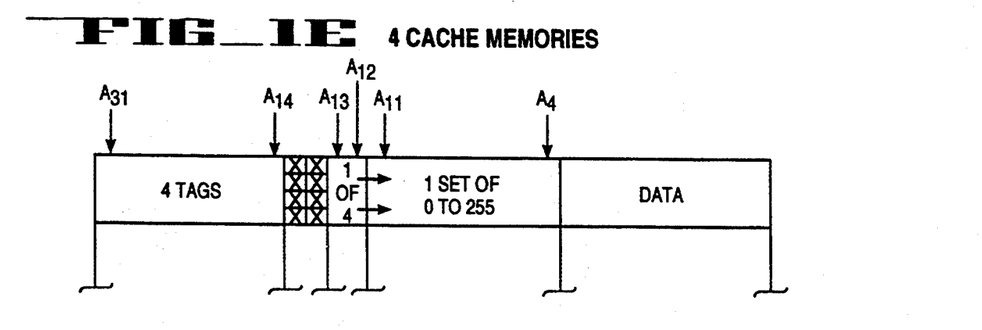
FIG. 1E illustrates the tag field range and set field size with four cache memories in an array.

Referring to FIGS. 1A and 1D, if there is only one controller/cache memory in an array, the tag fields consist of address bits $A_{12}$ through $A_{31}$ and the set fields consists of bits $A_4$ through $A_{11}$. The address A4 through All then selects a set (1 of 256 sets).

Referring to FIG. 1 B, if there are two controller/cache memories in an array, the tag field becomes narrower and consists of address bits $A_{13}$ through $A_{31}$ and, in effect, $A_{12}$ is moved to and becomes part of the set field. Specifically, $A_{12}$ is used to select one of the two cache memories through the enable memory circuit of FIG. 3. This is equivalent to $A_{12}$ being the highest order set bit. Thus, if $A_{12}$ is low, the first memory is selected and the set field is 0–255 as indicated by line 42 of FIG. 2. On the other hand, if $A_{12}$ is high, the second of the memories is selected and the set field ranges from 256 to 511 as indicated by the "2 of 2" line emerging from block 44 of FIG. 2.

Referring now to FIGS. 1C and 1 E, assume there are four controller/cache memories in an array. For this case, the tag fields consists of bits $A_{14}$ through $A_{31}$ with the address bits $A_{12}$ and $A_{13}$ being effectively part of the set fields. These two bits, as indicated by FIG. 3 are used to select one of the four memories in the array. By way of example, if a particular memory knows that it is "4 of 4" it communicates this information to the enable memory circuit 16 from the circuit 20 and the enable memory circuit 16 enables the memory when $A_{12}$ and $A_{13}$ are both high. Similarly, the "1 of 4" memory in the army is enabled when both address bits $A_{12}$ and $A_{13}$ are low, this causes the set field to have the range of 0–255 as indicated by line 43 of FIG. 2. For the second memory in an array of 4 memories, the set field has a range of 256–511 since this memory is enabled when $A_{13}$ is low and $A_{12}$ is high. Similarly, the third memory is enabled when $A_{13}$ is high and $A_{12}$ is low, providing a set field with a range of 512–767; and finally, the fourth memory is enabled when both $A_{12}$ and $A_{13}$ are high providing a set field range of 768–1023. In FIG. 1E the "X's" at the right end of the tag fields are used to indicate that for the four memory case, the bits $A_{12}$ and $A_{13}$ are ignored as part of the comparison and have been shifted to and operate as part of the set field.

Use of Invented Controller/Cache Memory In Microprocessor Systems

A. Configuration

Figure 4:
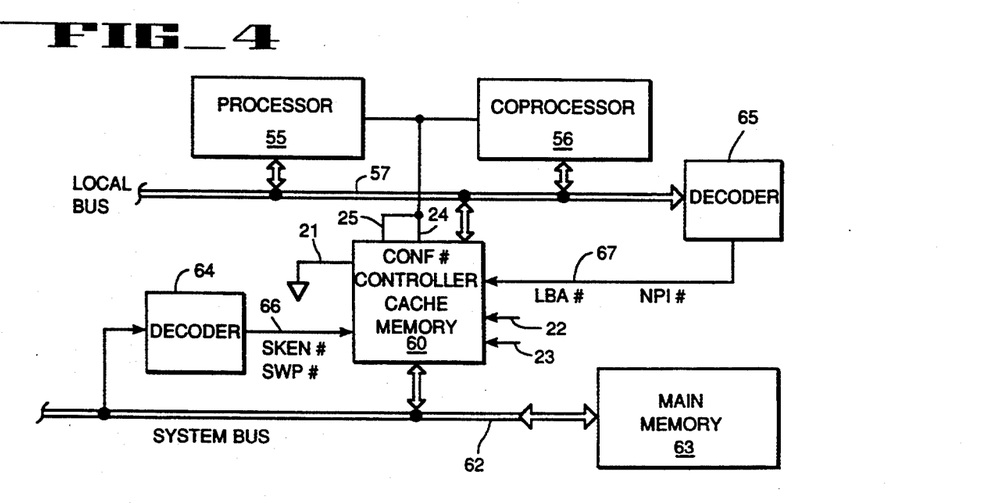
FIG. 4 is a block diagram of a microcomputer system containing two of the invented cache memories.

Referring first to FIG. 4, a typical microcomputer system employing one of the invented controller/cache memory 60 is illustrated. The memory 60 is coupled to a local bus 57 and to a system bus 62. A processor 55 (such as the Intel 386 ™) is coupled to the local bus 57; a coprocessor 56 (such as the Intel 387$^{TM}$) is also coupled to this bus. The system bus 62 is coupled to a main memory 63 such as a DRAM memory. Other peripherals are typically connected to the system bus 62. For the arrangement of FIG. 4, the configuration terminal 21 is coupled to ground as it is for the first (NO. 1) memory in the array (no matter how many others, if any, are in the array). For the arrangement of FIG. 4, the Ready0# terminal 24 and the Ready1# terminal 25 are shown connected together, and connected to the processor and coprocessor. (In subsequent examples, these ready lines are shown not directly connected as will be discussed.) Decoder 65 asserts on line 67 LBA# and/or NPI# whenever an access is made to an address which is used by a local bus device or to an address which requires non-posted accesses. The decoder's programming depends on the specific implementation of the system in which the memory 60 is used. The SKEN# and SWP# signals on lines 66 are provided by decoder 64 for accesses to non-cacheable addresses or to write-protected addresses.

Importantly, it should be noted that the first memory 60 used in an array has its configuration terminal 21 coupled to ground. Hence, upon reset CONF# will be high as indicated by line 51 of FIG. 2, informing the memory 60 that it is the first in the array. As previously mentioned, a signal on line 28 of FIG. 3 causes driver 28 memory NO. 1 to provide control signals for the bus 62. During the next few clock cycles for the arrangement of FIG. 4, no ready signals will be sensed on line 24 and thus, the conditions represented by line 41 of FIG. 2 are met; that is, memory 60 is the only cache memory in the array.

Figure 5A:
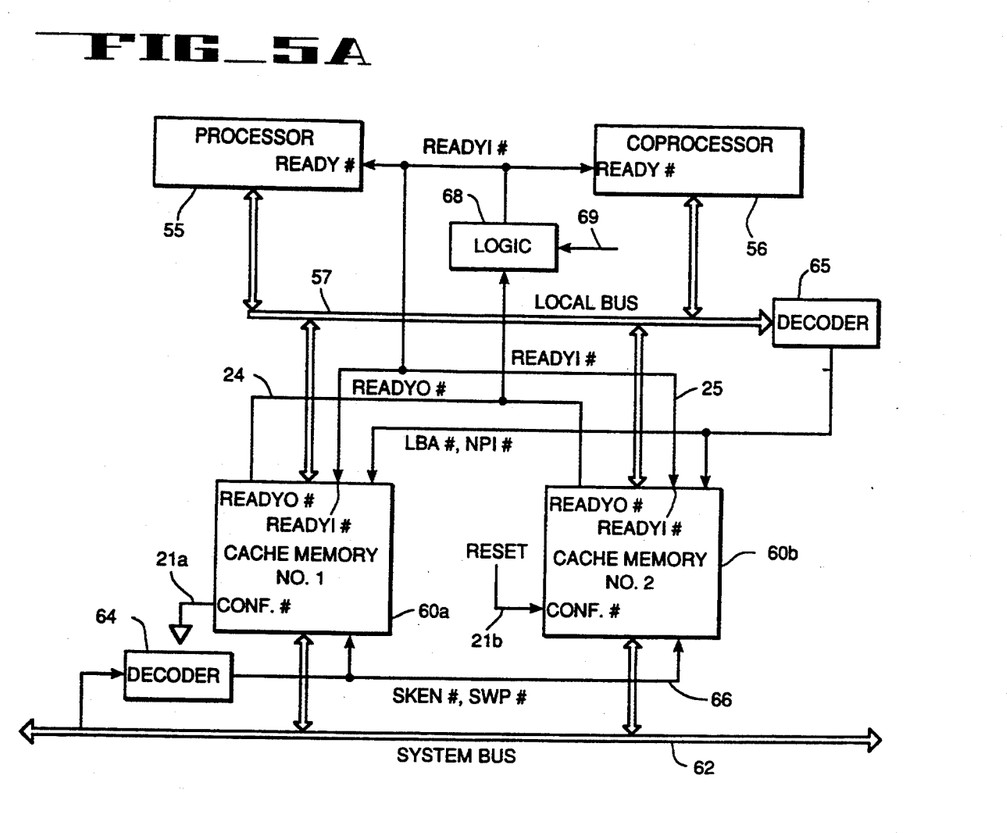
FIG. 5A is a block diagram of a microcomputer system with two of the invented cache memories.

In FIG. 5A, a computer system is illustrated with includes two controller/cache memories identified as memories 60a (NO. 1) and 60b (NO.2). The only difference between these memories' coupling to the system is in their configuration terminal connections. Note the configuration terminal 21a of memory 60a is again coupled to ground, while the configuration terminal 21b of memory 60b is coupled to the reset line. Otherwise, both memories are coupled in the same manner to the buses and lines in the system. For example, both memories receive the reset signal on their reset terminal as well as the clocking signal (not illustrated). The Ready0# terminals of both memories are coupled to logic circuit 68. This circuit is an ordinary OR gate which receives other inputs such as on line 69 to allow a logical ORing of other ready signals to the processor and coprocessor (from devices other than the array). The Ready1# signal, the output of the logic circuit 68, is coupled to the line/terminals 25

Figure 5B:
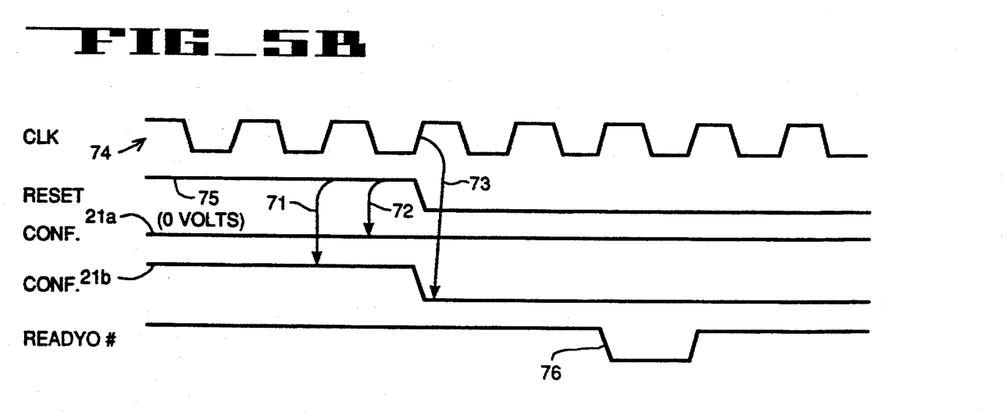
FIG. 5B illustrates a plurality of waveforms associated with the block diagram of FIG. 5A.

As will be seen, the fact that the configuration terminal of the second memory is coupled to the reset line allows the second memory to determine its place in the army. In FIG. 5B, the clocking signal 74 is shown which, as mentioned, is applied to both memories. Also, the reset signal 75 is shown which is coupled to the reset terminal of both memories and the configuration terminal of memory 60b. During reset when the reset signal is high, the control circuits of both memories 60a and 60b sense the signal on their respective configuration terminals as represented by block 34 of FIG. 2. Memory 60a senses the potential on line 21a which is ground potential. This is indicated by the arrow 72. The complement of this signal (CONF#) is high as indicated by line 51 in FIG. 2 alerting memory 60a to its status as the primary (NO. 1) memory in the array. Memory 60b, on the other hand, at this time (reset still active) senses a high potential on its configuration terminal as shown by arrow 71. Accordingly, memory 60b determines that it is not NO. 1 in the army. After the reset signal become inactive, and under control of the clocking signals as indicated by line 73, memory 60b again senses the potential on its configuration terminal. This time it finds the potential low since the reset signal has dropped in potential. The complement of this low signal is shown by line 49 in FIG. 2. Memory 60b then provides a signal on line 24, this is shown as waveform 76 in FIG. 5B and is represented by block 38 of FIG. 2. (In the current implementation, two clock cycles occur before waveform 76 is provided). The waveform 76 is sensed by memory 60a on line 24. Memory 60a having counted one count (there will only be one ready signal in the first few clocking cycles since there are no other memories in the array) determines that there are two memories in the array as indicated by line 42 of FIG. 2. Similarly, since there are no additional ready signals, the NO. 2 memory determines that it is "2 of 2" in the array.

Figure 6A:
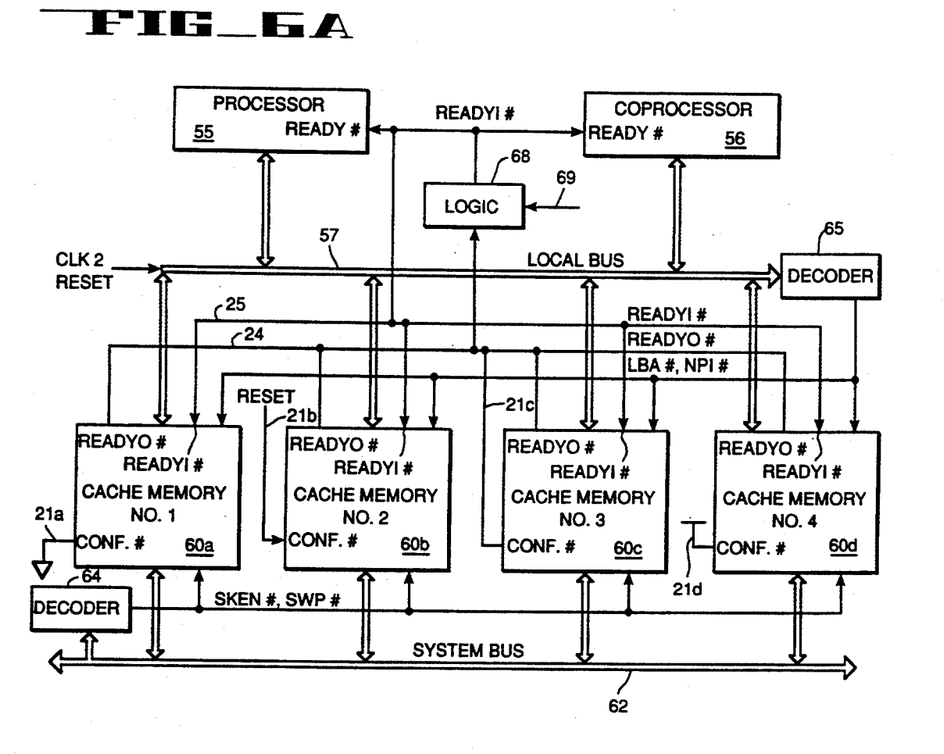
FIG. 6A is a block diagram of a microcomputer system with four of the invented cache memories.

Referring now to FIG. 6A, a computer system is again shown, however this time with four controller/cache memories 60a, 60b, 60c and 60d in an array. Each of the memories is coupled to both the local bus and the system bus as in the previous examples. The memories receive the Ready1# signal, the reset signal on their reset terminal and clock signal on their clocking terminal (the latter two terminals are not illustrated in this figure). The only difference between the memories insofar as their coupling in the system of FIG. 6A is concerned, is that the configuration terminal of 21a of memory 60a is coupled to ground, the configuration terminal 21b of memory 60b is coupled to the reset line, the configuration 21c of memory 60c is coupled to the Ready0# line and finally, the configuration terminal 21d of memory 60d is coupled to the Vcc potential (5 Volts).

Figure 6B:
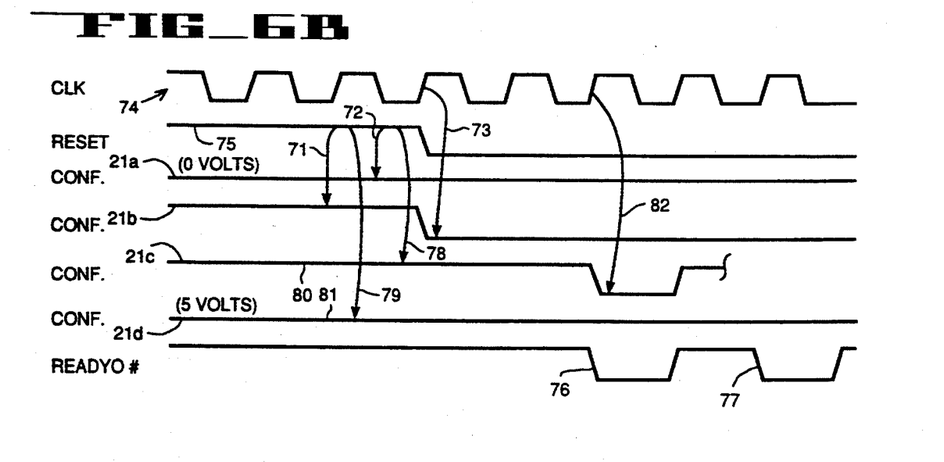
FIG. 6B illustrates a plurality of waveforms associated with the block diagram of FIG. 6A.

The waveforms in 6B, in conjunction with the logic diagram of FIG. 2, illustrates the initialization occuring on reset for the system of FIG. 6A.

When the reset signal is high, as previously indicated by arrows 71 and 72, memories 60a and 60b sense their configuration terminal. During this time, memory 60d senses the waveform 80 as indicated by arrow 78, a high potential (Ready0# is high at this time). Thus, memory 60c proceeds to step or block 36 of FIG. 2. Likewise memory 60c, as indicated by arrow 79 and waveform 81 senses a positive potential, the complement of which is low; memory 60c hence is logically at block 36. At the time indicated by the arrow 73, both memories 60c and 60d again sense their configuration terminal. There is no change in the potential for waveforms 80 and 81 at the time represented by arrow 73 and accordingly, the logic associated with these memories proceeds to block 39 of FIG. 2. After two clock cycles as indicated by arrow 82, waveform 80 drops in potential because memory 60b has issued a Ready0# signal (waveform 76). Thus, memory 60c determines that it is "3 of 4" as indicated by line 47 of FIG. 2. Then memory 60d issues a Ready0# signal (waveform 77) thereby informing memories 60a and 60b that there are four memories in the array. Since the configuration terminal of memory 60d is always high (CONF# low) this memory knows that it is "4 of 4" in the array.

B. Bus Driving

On the local bus 57, the Ready0# signal is the only signal driven by all of the cache memories. Nominally, the Ready0# line 24 is not driven, rather a pull-up device external to the memories is used to maintain this line at $V_{cc}$. Typically, a resistor couples this line to $V_{cc}$. During cacheable read cycles, the selected memory drives Ready0# active until Ready1# (line 25)is sense active, then the selected memory drives Ready0# inactive for one clock phase; line 25 is then released by the memory and allowed to be pulled up by the external pull-up device. In other cycles, the primary (NO. 1 memory) drives Ready0# in the same manner. On the data bus, the selected memory drives the data bus during the "T2" portion of the read cycle, thereby ensuring no contention with the processor when a read cycle follows the write cycle.

On the system bus 62 as mentioned, the primary memory drives all the system bus signals except the SADS#. Thus, the possibility of contention exists only for the SADS# signal. The SADS# line is nominally not driven by any of the memories, but rather left floating with the line carrying this signal coupled to a pull-up device. All the memories in the array, including the primary, after driving the SADS# line active, drive it inactive for one clock phase then allow it to float. During line fills, the SADS# line signal is driven by the memory which detects the miss. In all other cycles, including write cycles, the SADS# line is driven by the primary memory.

Thus, by the simple connection to the configuration terminal to the various signals available in the computer system, each of the four controller/cache memories determines how many memories are in the array of memories and its relative position in the array. Moreover, each of the memories adjusts its tag field and set fields in a manner totally transparent to the computer system to provide additional cache memory.

We claim:

1. A cache memory for operation in a cache memory array comprising at least one cache memory, said cache memory comprising:

data storage for storing data;

tag field storage for storing tag fields, each of said tag fields representing an address of said stored data and comprising a plurality of bits;

a selection circuit coupled to said data storage and said tag field storage, said selection circuit comprising a plurality of set fields, each of said set fields comprising a plurality of bits, said selection circuit for receiving an incoming address and for selecting tag fields from said tag field storage based on said set fields and said incoming address;

comparator coupled to said tag field storage and said data field storage for receiving said incoming address and for matching said incoming address against said selected tag fields to select one of said stored data, said matching being performed using n contiguous bits from each of said selected tag fields and said incoming address, where n is a positive integer greater than one;

a logic circuit for generating a configuration signal for each cache memory in said cache memory array, wherein one configuration signal is active during each clock cycle, starting in an initial time period, for a different cache memory;

a configuration circuit coupled to said logic circuit for receiving a configuration signal and for sensing said configuration signal every clock cycle to count, from said initial time period, clock cycles until an active configuration signal is sensed to determine an order for said cache memory in said cache memory array, said configuration circuit for generating a ready signal, upon receipt of said active configuration signal, indicating said order of said cache memory in said cache memory array, and for sensing, each clock cycle, said ready signal, generated from a different cache memory in said cache memory array, to indicate a total number of cache memories in said cache memory array, said configuration circuit for generating at least one control signal to indicate said total number of cache memories in said cache memory array; and a second control circuit coupled to said comparator and to said configuration circuit, said control circuit for receiving said control signal, and in response, dynamically determining said integer n as a function of said control signal.

2. The cache memory as described in claim 1, wherein said control circuit determines a first said integer n when said control signal indicates that said cache array contains one cache memory, and said control circuit determines a second said integer n smaller than said first said integer n when said control signal indicates that said cache array contains more than one cache memory.

3. The cache memory as described in claim 2, wherein bits said tag field bit not used by said comparator circuit in matching are allocated to said set fields.

4. The cache memory as described in claim 3, wherein said control circuit further comprises means for selectively enabling said cache memory, said control circuit using said bits not used by said comparator means allocated to said set fields to selectively enable said cache memory.

5. A computer system comprising:

a processor;

a cache array comprising at least one cache memory and being coupled to said processor, wherein each cache memory in said cache array comprises:

data storage for storing data;

a tag field storage for storing tag fields, each of said tag fields representing an address for said data stored and comprising a plurality of bits;

a selection circuit coupled to said data storage and said tag field storage, said selection circuit comprising a plurality of set fields, each of said set fields comprising a plurality of bits, said selection circuit for receiving an incoming address and for selecting tag fields from said tag field storage based on said set fields and said incoming address;

a comparator coupled to said tag field storage and said data field storage for receiving said incoming address and for matching said incoming address against said selected tag fields to select one of said stored data, said matching being performed using n contiguous bits from each of said selected tag fields and said incoming address, where n is a positive integer greater than one;

a logic circuit for generating a configuration signal for each cache memory in said cache memory array, wherein one configuration signal is active during each clock cycle, starting in an initial time period, for a different cache memory;

a configuration circuit coupled to said logic circuit for receiving a configuration signal and for sensing said configuration signal every clock cycle to count, from said initial time period, clock cycles until an active configuration signal is sensed to determine an order for said cache memory in said cache memory array, said configuration circuit for generating a ready signal, upon receipt of said active configuration signal, indicating said order of said cache memory in said cache memory array, and for sensing, each clock cycle, said ready signal, generated from a different cache memory in said cache memory array, to indicate a total number of cache memories in said cache memory array, said configuration circuit for generating at least one control signal to indicate said total number of cache memories in said cache memory array; and a control circuit coupled to said comparator and to said configuration circuit, said control circuit for receiving said control signal, and in response, dynamically determining said integer n as a function of said control signal.

6. A method for storing data in a cache array comprising at least one cache memory, said method comprising the steps of:

storing data in a data storage array;

storing tag fields in a tag field storage wherein each of said tag fields represents an address for said data stored and comprise a plurality of bits;

storing a plurality of set fields, each of said set fields comprising a plurality of bits;

generating a configuration signal for each cache memory in said cache memory array, wherein one configuration signal is active during each clock cycle, starting in an initial time period, for a different cache memory;

sensing said configuration signal every clock cycle to count, from said initial time period, clock cycles until an active configuration signal is sensed to determine an order for said cache memory in said cache memory array; generating a ready signal, upon receipt of said active configuration signal, indicating said order of said cache memory in said cache memory array;

sensing, each clock cycle, said ready signal, generated from a different cache memory in said cache memory array, to indicate a total number of cache memories in said cache memory array;

generating at least one control signal to indicate said total number of cache memories in said cache memory array;

determining an integer n as a function of said control signal, wherein n is a positive integer greater than one;

receiving an incoming address for said cache memory;

selecting tag fields from said tag field storage based on said set fields and said incoming address; and matching said incoming address against said tag fields selected to select one of said data stored, said matching being performed using n contiguous bits from each of said selected tag fields and said incoming address.

* * * * *

UNITED STATES PATENT AND TRADEMARK OFFICE
CERTIFICATE OF CORRECTION

PATENT NO. : 5,418,928

DATED : May 23, 1995

INVENTOR(S) : Yarkoni, et al

Page 1 of 2

It is certified that error appears in the above-indentified patent and that said Letters Patent is hereby corrected as shown below:

Title page, item [54] & Col. 1, line 3, insert --POSITION-- following "RELATIVE" and prior to "OF"

In column 1 at line 16 delete "memo" and insert --memory--

In column 1 at line 24 delete "circuit" and insert --circuitry--

In column 1 at line 24 delete "ad" and insert --art--

In column 1 at line 31 delete "interlace" and insert --interface--

In column 1 at line 39 delete "memo" and insert --memory--

In column 1 at line 41 delete "pa" and insert --part--

In column 1 at line 45 delete "a" and insert --art--

In column 3 at line 35 delete "army" and insert --array--

In column 3 at line 43 delete "army" and insert --array--

In column 4 at line 15 delete "with" and insert --write--

UNITED STATES PATENT AND TRADEMARK OFFICE
CERTIFICATE OF CORRECTION

PATENT NO. : 5,418,928

DATED : May 23, 1995

INVENTOR(S) : Yarkoni, et al

It is certified that error appears in the above-indentified patent and that said Letters Patent is hereby corrected as shown below:

In column 6 at line 2 delete "!f" and insert --If--

In column 7 at line 50 delete "army" and insert --array--

In column 10 at line 22 delete "bit" and insert --bits--

Signed and Sealed this

Nineteenth Day of August, 1997

*Attest:*

BRUCE LEHMAN

*Attesting Officer*  Commissioner of Patents and Trademarks